July 17, 1951     T. R. SELBY     2,560,603
APPARATUS FOR CLEANING ANIMAL INTESTINES
Filed May 17, 1944
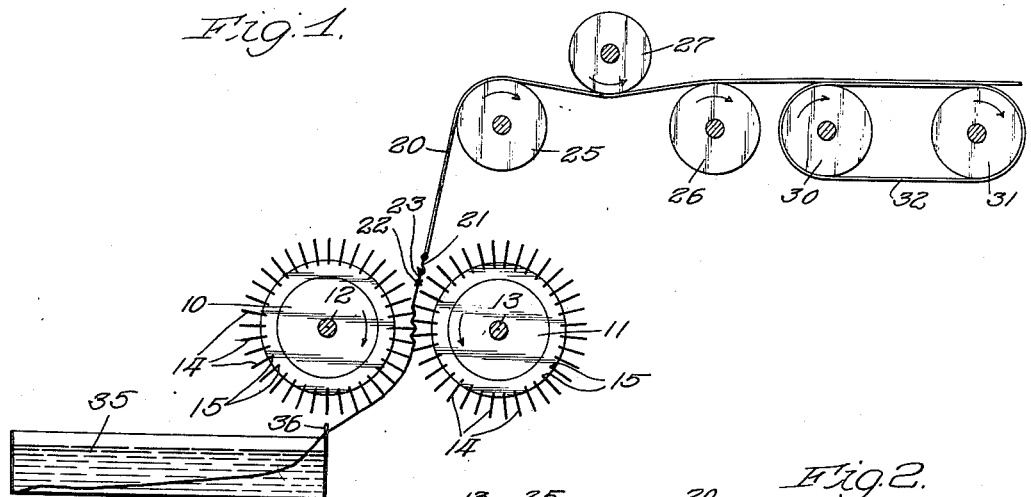
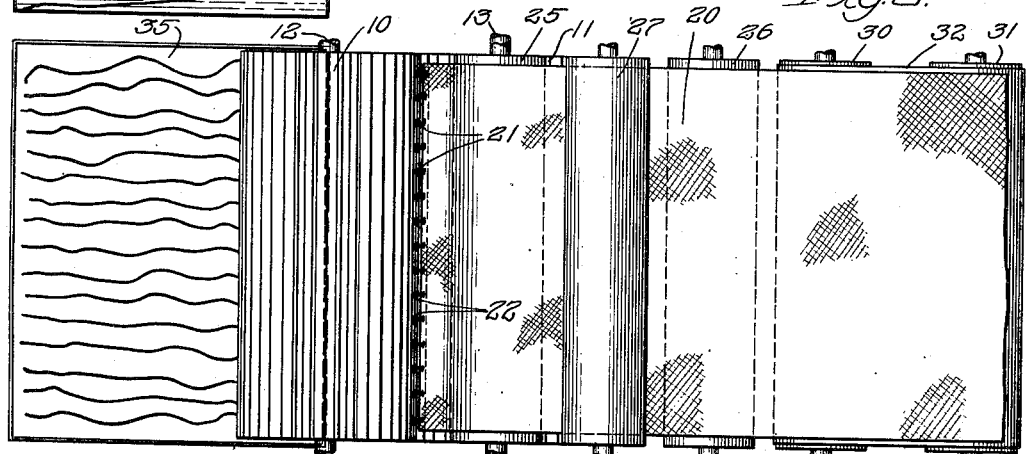
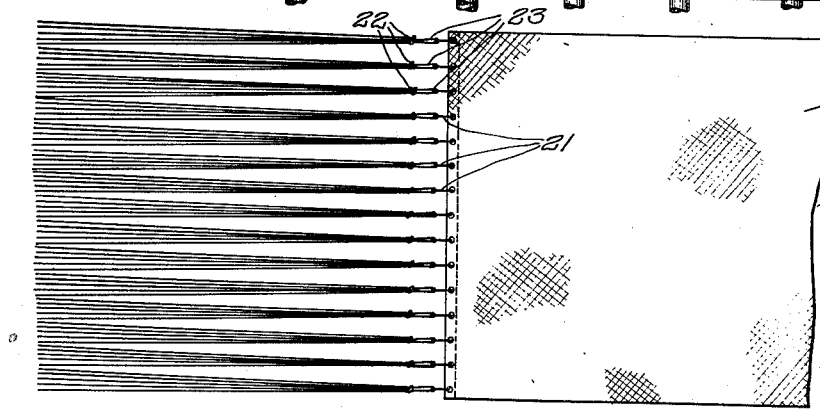
Inventor
Theodore R. Selby Patented July 17, 1951

2,560,603

UNITED STATES PATENT OFFICE 2,560,603

APPARATUS FOR CLEANING ANIMAL INTESTINES

Theodore R. Selby, Chicago, Ill., assignor to Wilson & Co. Inc., a corporation of Delaware Application May 17, 1944, Serial No. 536,056

6 Claims. (Cl. 17—43)

This invention relates to a method of and apparatus for cleaning split animal intestines, and particularly intestines of the smaller animals such as sheep and hogs.

In the past it has been the practice to clean split animal intestines by scraping first one side and then another with a knife or other instrument. This is an extremely slow, laborious and imperfect task. As is well known, it involves the removal not simply of extraneous material but of tissue layers which are on each side of the layer of tissue which forms the intestine proper. The present invention provides a much more rapid and efficient method of cleaning which not only cleans both sides of the split intestine at the same time but acts uniformly on all sections of the split intestines and may be employed with many split intestines simultaneously.

The invention is illustrated in the drawings in which Figure 1 is a sectional elevation through the cleaning rolls; Figure 2 is a plan view looking down upon the rolls; Figure 3 represents a group of split intestines illustrating how they may be tied together in a group for processing.

As shown in the drawings, the apparatus comprises a pair of rolls 10 and 11 mounted on shafts 12 and 13. Each roll is provided with a number of longitudinal thin dull blades 14 which are held in position upon the circumference of the rolls as indicated at 15. These blades need not be sharp but are preferably kept with reasonably square corners. A knife edge is, however, to be avoided.

The rolls are so positioned adjacent each other that intermeshing of the blades occurs. The position of the rolls may be made adjustable in any desired manner so that the degree of intermeshing can be controlled for the treatment of different kinds of casings. In general, however, a maximum overlap of ⅛ to ⅜ inch is satisfactory. In the drawing, the overlap is indicated as being approximately ¼ inch on a total diameter of 8¼ inches for each roll from blade tip to blade tip. The amount of overlap will of course depend also somewhat upon the speed of rotation, and the figures given are for an approximate rate of 360 R. P. M.'s. There are preferably about 36 blades circumferentially arranged.

The split intestines are assembled for cleaning on a canvas sheet 20 which has the width of the rolls and is provided at one end with a series of hooks 21. The intestines are split and tied at 22 with a cord 23 which is then looped over one of the hooks 21. A number of split intestines, usually from 30 to 60 split sections, may be secured to each hook. The canvas 20 is then placed on rolls 25 and 26 and roll 27 is moved downwardly thereon to place the canvas under tension. In this position the end of the canvas is immediately above rollers 10 and 11 so that the strings 23 are above the knives or blades 14. The rollers 10 and 11 are then moved together to intermesh the knives and the power is turned on to start the rollers. This also moves the rollers 25, 26 and 27 and rollers 30 and 31 which carry a canvas or other frictional belt 32. During this operation the roller 26 moves at a faster rate than 27 and 25 in order to place the split intestines under tension at that point and at the same time the rollers 30 and 31 move more rapidly than the roller 26 so as to maintain tension on the belt 32. The difference in motion is made up by slipping of the split intestines together with a considerable amount of stretching thereof. During this type of cleaning operation the split intestines can increase as much as 50% in length. The split intestines hanging from the canvas 20 are maintained in an elongated bath tank 35 in which they are maintained under proper conditions for suitable cleaning. As they are drawn upwardly between the rolls 10 and 11 they are placed under tension and at the same time the individual split intestines, which have a tendency to curl into a cylinder, are stretched out flat so that both sides may be cleaned simultaneously.

The comb 36 is provided at the end of the bath 35 in order to maintain the groups of split casings in proper lateral adjustment.

A suitable rate of feed of the intestines through the rolls 10 and 11 is approximately six feet per minute. The roller 26 under these conditions has a peripheral speed of approximately 1,200 feet per minute and the canvas 32 a speed of approximately seven feet per minute. These figures are for split sheep intestines. The difference between the rate of feed of 6 feet per minute and the speed of the canvas of 7 feet per minute is made up by slipping of the intestines together with the stretching thereof.

It is generally preferred to pass the split intestines through the cleaner twice rather than to attempt to remove all of the undesirable material in a single operation.

The foregoing detailed description has been given for clearness of understanding only, and no unnecessary limitations should be understood therefrom.

What I claim as new, and desire to secure by Letters Patent, is:

1. A split intestine cleaning machine comprising a pair of substantially parallel rolls, laterally rigid blades mounted on the rolls longitudinally thereof and angularly disposed at a small acute angle with respect to each other, means associated with the rolls for rotating the rolls in opposite directions at a synchronous rate, said blades extending outwardly from the rolls in intermeshing relationship, pulling means operatively positioned on one side of said intermeshing blades and driven in a direction opposite to the direction of movement of the intermeshing blades, and means associated with said pulling means for securing split intestines thereto for pulling split intestines between said rolls under stretching tension and in a direction opposite to the direction of movement of the intermeshing blades thereby enabling the blades to scrape substantially all of the surface of said intestines.

2. The cleaning machine of claim 1 wherein said blades overlap approximately 1/8 to 3/8 inch at the point of intermesh.

3. The cleaning machine of claim 1 in which the blades are radially mounted on the rollers and the angle between blades is not substantially greater than 10°.

4. The cleaning machine of claim 1 including means operatively positioned to exert stretching tension on said intestines after their passage between the rollers.

5. The cleaning machine of claim 1 including a comb operatively positioned on the side of the intermeshing blades opposite to said pulling means for separating a group of intestines secured to said pulling means into individual strands before said strands are pulled between said intermeshing blades.

6. The cleaning machine of claim 5 including a soaking bath operatively positioned adjacent the comb adapted to receive a group of split intestines before they are pulled through the comb and the intermeshing blades by said pulling means.

THEODORE R. SELBY.

REFERENCES CITED

The following references are of record in the file of this patent:

UNITED STATES PATENTS

| Number | Name | Date |
|---|---|---|
| 84,358 | Huss | Nov. 24, 1868 |
| 222,567 | Baumle | Dec. 16, 1879 |
| 1,723,714 | Stohrer | Aug. 6, 1929 |
| 1,763,002 | Mathews | June 10, 1930 |
| 1,780,480 | Grigg | Nov. 4, 1930 |
| 2,171,611 | Tolman et al. | Sept. 5, 1939 |

FOREIGN PATENTS

| Number | Country | Date |
|---|---|---|
| 492,086 | Great Britain | Sept. 14, 1938 |